United States Patent
Xu et al.

(10) Patent No.: US 10,904,865 B2
(45) Date of Patent: Jan. 26, 2021

(54) LOW LATENCY PHYSICAL LAYER DESIGN FOR CONTENTION-BASED UPLINK CHANNELS

(71) Applicant: QUALCOMM Incorporated, San Diego, CA (US)

(72) Inventors: Hao Xu, Beijing (CN); Aleksandar Damnjanovic, Del Mar, CA (US); Onkar Jayant Dabeer, Redmond, WA (US); Peter Gaal, San Diego, CA (US); Wanshi Chen, San Diego, CA (US); Shimman Arvind Patel, San Diego, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/129,452

(22) Filed: Sep. 12, 2018

(65) Prior Publication Data
US 2019/0029013 A1 Jan. 24, 2019

Related U.S. Application Data

(63) Continuation of application No. 14/951,393, filed on Nov. 24, 2015, now Pat. No. 10,129,858.
(Continued)

(51) Int. Cl.
*H04W 4/00* (2018.01)
*H04W 72/04* (2009.01)
(Continued)

(52) U.S. Cl.
CPC ....... *H04W 72/0413* (2013.01); *H04L 1/1812* (2013.01); *H04L 5/0037* (2013.01);
(Continued)

(58) Field of Classification Search
CPC ... H04W 76/27; H04W 74/08; H04W 74/008; H04W 72/14; H04W 72/1294
See application file for complete search history.

(56) References Cited

U.S. PATENT DOCUMENTS 9,408,232 B2   8/2016   Damnjanovic et al.
9,844,073 B2   12/2017  Ray et al.
(Continued)

FOREIGN PATENT DOCUMENTS

CN   101299821 A    11/2008
JP   2007504708 A   3/2007
(Continued)

OTHER PUBLICATIONS

"3rd Generation Partnership Project; Technical Specification Group Radio Access Network; Feasibility study for Further Advancements for E-UTRA (LTE-Advanced) (Release 12)", 3GPP Standard; 3GPP TR 36.912, 3rd Generation Partnership Project (3GPP), Mobile Competence Centre ; 650, Route Des Lucioles ; F-06921 Sophia-Antipolis Cedex ; France, vol. RAN WG1, No. V12.0.0, Sep. 24, 2014 (Sep. 24, 2014), pp. 1-62, XP050925880.
(Continued)

*Primary Examiner* — Bo Hui A Zhu
(74) *Attorney, Agent, or Firm* — Patterson + Sheridan LLP

(57) ABSTRACT

Certain aspects relate to methods and apparatus for latency reduction for UEs in a RRC connected mode. During contention-based uplink access by groups of UEs within a subframe, an eNB may decode the received uplink transmission based, at least in part, on the assigned group of resources assigned to the UE and used for transmission. Additional orthogonalization techniques such as reduced TTI size can be used to reduce collisions among different users performing contention-based transmissions. Furthermore, when the eNB fails to successfully decode the uplink
(Continued)

transmission, the eNB may identify the UE that sent the uplink transmission based on a detected reference signal and may transmit an uplink assignment to the identified UE.

21 Claims, 7 Drawing Sheets

Related U.S. Application Data

(60) Provisional application No. 62/084,497, filed on Nov. 25, 2014.

(51) Int. Cl.

| | | |
|---|---|---|
| *H04W 28/02* | (2009.01) | |
| *H04W 72/14* | (2009.01) | |
| *H04W 74/08* | (2009.01) | |
| *H04L 1/18* | (2006.01) | |
| *H04W 74/00* | (2009.01) | |
| *H04L 5/00* | (2006.01) | |
| *H04W 76/27* | (2018.01) | |
| *H04J 11/00* | (2006.01) | |
| *H04W 72/12* | (2009.01) | |
| *H04W 74/02* | (2009.01) | |

(52) U.S. Cl.
CPC ....... *H04W 28/0278* (2013.01); *H04W 72/14* (2013.01); *H04W 74/006* (2013.01); *H04W 74/08* (2013.01); *H04W 76/27* (2018.02); *H04J 11/0023* (2013.01); *H04W 72/1294* (2013.01); *H04W 74/008* (2013.01); *H04W 74/02* (2013.01); *H04W 74/0858* (2013.01)

(56) References Cited

U.S. PATENT DOCUMENTS

| | | | |
|---|---|---|---|
| 2012/0182977 A1 | 7/2012 | Hooli et al. | |
| 2014/0192767 A1 | 7/2014 | Au et al. | |
| 2014/0254530 A1* | 9/2014 | Kim | H04L 5/0019 370/329 |
| 2016/0050667 A1* | 2/2016 | Papasakellariou | H04W 74/0808 370/329 |
| 2016/0100431 A1 | 4/2016 | Kishiyama et al. | |
| 2016/0150525 A1 | 5/2016 | Xu et al. | |
| 2017/0055294 A1 | 2/2017 | Lee et al. | |

FOREIGN PATENT DOCUMENTS

| | | | |
|---|---|---|---|
| JP | 2009225363 A | 10/2009 | |
| JP | 2012114943 A | 6/2012 | |
| JP | 2013118688 A | 6/2013 | |
| JP | 2013522940 A | 6/2013 | |
| JP | 2014220662 A | 11/2014 | |
| KR | 20120113698 A | 10/2012 | |
| WO | WO-2007022787 A1 | 3/2007 | |
| WO | WO-2010057540 A1 | 5/2010 | |
| WO | 2011085403 A1 | 7/2011 | |
| WO | WO-2011086525 A1 | 7/2011 | |
| WO | 2011133776 A1 | 10/2011 | |
| WO | WO-2011120443 A1 | 10/2011 | |
| WO | 2011136586 A2 | 11/2011 | |
| WO | WO-2013107036 A1 | 7/2013 | |
| WO | WO-2014090200 A1 | 6/2014 | |

OTHER PUBLICATIONS

Ericsson et al., "Contention Based Uplink Transmissions," 3GPP Draft; R2-093812 Contention Based Uplink, 3rd Generation Partnership Project (3GPP), Mobile Competence Centre ; 650, Route Des Lucioles ; F-86921 Sophia-Antipolis Cedex ; France, No. Los Angeles, USA; Jun. 23, 2009, Jun. 23, 2009 (Jun. 23, 2009), XP050352029.

I C-L, "Defining the Wireless Future—Vision 2020: Perspectives of Mobile Operators (5G: Data Rate and More)," Keynote ICC2014, Jun. 13, 2014 (Jun. 13, 2014), pp. 1-33, XP055227730, Retrieved from the Internet: URL:http://icc2014.ieee-icc.org/speakers_28_2327600902.pdf.

International Search Report and Written Opinion—PCT/US2015/062596—ISA/EPO—dated Jun. 2, 2016.

Partial International Search Report—PCT/US2015/062596—ISA/EPO—dated Mar. 30, 2016.

\* cited by examiner

LOW LATENCY PHYSICAL LAYER DESIGN FOR CONTENTION-BASED UPLINK CHANNELS

CROSS-REFERENCE TO RELATED APPLICATIONS

This application is a continuation of U.S. patent application Ser. No. 14/951,393, filed Nov. 24, 2015, which claims benefit of U.S. Provisional Application Ser. No. 62/084,497, filed on Nov. 25, 2014, each of which is assigned to the assignee hereof and hereby expressly incorporated by reference herein.

FIELD

The present disclosure relates generally to wireless communications and, more specifically, to methods and apparatus for low-latency contention-based access within an uplink subframe.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (BSs) that can support communication for a number of user equipments (UEs). A UE may communicate with a base station (BS) via the downlink and uplink. The downlink (or forward link) refers to the communication link from the BS to the UE, and the uplink (or reverse link) refers to the communication link from the UE to the BS. A BS may transmit data and control information on the downlink to a UE and/or may receive data and control information on the uplink from the UE.

Currently, a UE transmits uplink data after receiving a grant from a BS for uplink transmissions. Unnecessary delays in transmission of uplink data may occur during low uplink traffic scenarios, as the UE waits for the uplink grant. It is desirable to reduce delays for uplink transmissions.

SUMMARY

Certain aspects of the present disclosure provide a method for wireless communication by an evolved Node B (eNB). The method generally includes assigning different groups of resources, within an uplink subframe, to different groups of one or more user equipments (UEs), wherein each UE selects resources from its assigned group for contention-based access within the uplink subframe and decoding uplink transmissions received from the UEs in the subframe based, at least in part, on the assigned group of resources.

Certain aspects of the present disclosure provide an apparatus for wireless communication. The apparatus generally includes means for assigning different groups of resources, within an uplink subframe, to different groups of one or more user equipments (UEs), wherein each UE selects resources from its assigned group for contention-based access within the uplink subframe, and means for decoding uplink transmissions received from the UEs in the subframe based, at least in part, on the assigned group of resources.

Certain aspects of the present disclosure provide an apparatus for wireless communication. The apparatus generally includes at least one processor and a memory coupled to the at least one processor with instructions stored thereon. The instructions may be executable by the processor to assign different groups of resources, within an uplink subframe, to different groups of one or more user equipments (UEs), wherein each UE selects resources from its assigned group for contention-based access within the uplink subframe, and decode uplink transmissions received from the UEs in the subframe based, at least in part, on the assigned group of resources.

Certain aspects of the present disclosure provide a computer readable medium for wireless communication having instructions stored thereon. The instructions are executable by one or more processors for assigning different groups of resources, within an uplink subframe, to different groups of one or more user equipments (UEs), wherein each UE selects resources from its assigned group for contention-based access within the uplink subframe, and decoding uplink transmissions received from the UEs in the subframe based, at least in part, on the assigned group of resources.

Numerous other aspects are provided including apparatus, systems and computer program products. Various aspects and features of the disclosure are described in further detail below.

DETAILED DESCRIPTION

Figure 1:
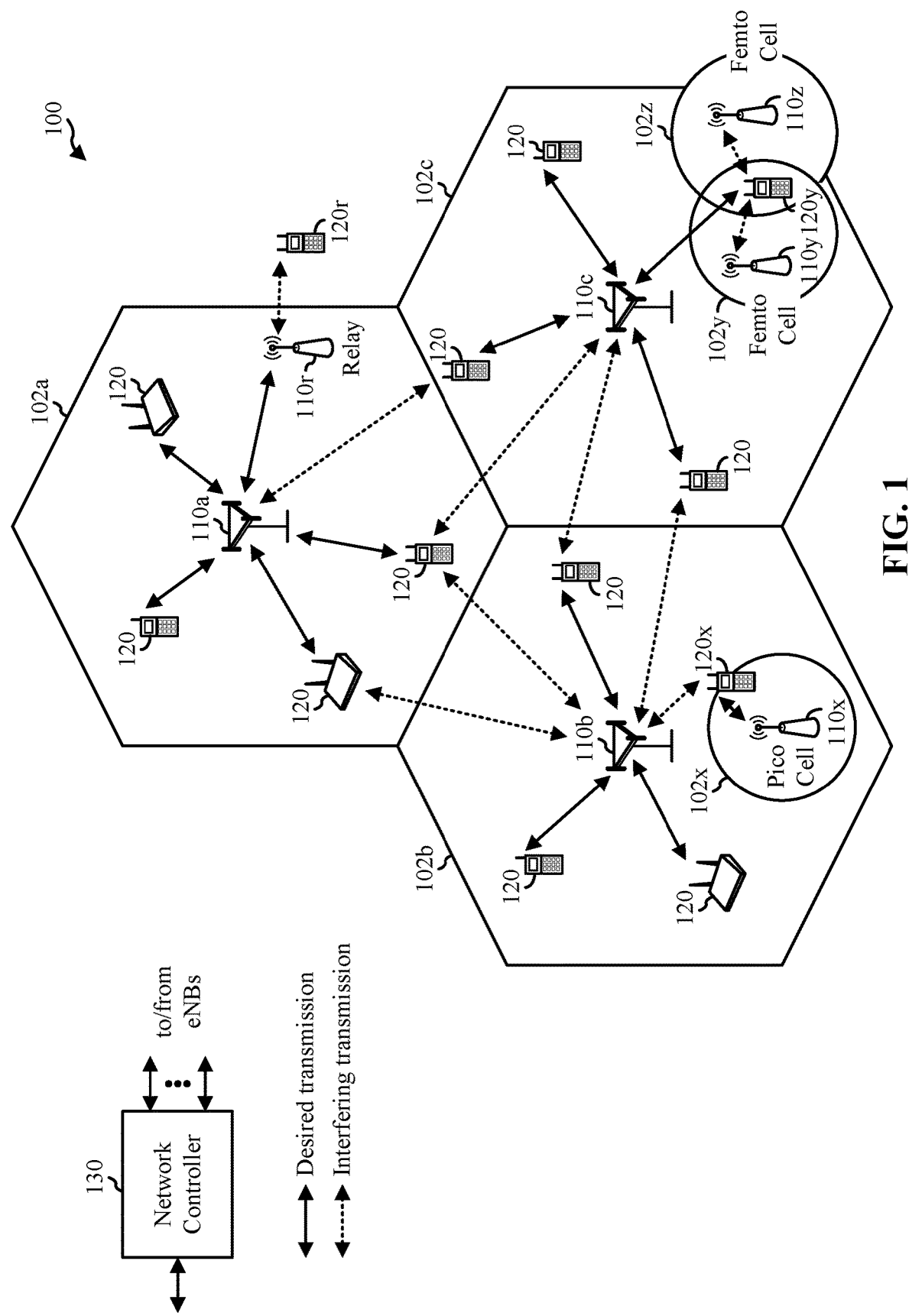
FIG. 1 is a block diagram conceptually illustrating an example of a wireless communications network in accordance with certain aspects of the present disclosure.

In LTE networks, a UE may transmit a scheduling request (SR) or a message on a random access channel (RACH) to an eNB when it has uplink (UL) data to transmit. In response, the UE may receive, from an eNB, a grant for UL transmissions. Thereafter, the UE may transmit UL data.

In an effort to reduce latency, according to aspects of the present disclosure, the eNB may schedule different groups of resources, within an uplink subframe, to different groups of UEs. The UEs may select resources from its assigned group of resources, for contention-based uplink access.

Using techniques described herein, when there is no contention, the eNB may receive uplink contention-based transmissions on an uplink channel (e.g., PUSCH) with less delay, as compared to conventional means (e.g., as compared to when a UE performs UL transmissions after receiving an UL grant). However, when uplink collisions occur, an increased delay, relative to conventional means, may occur. For example, when uplink collisions occur, the eNB may decode uplink data with increased latency as compared to if the UE had transmitted a SR or a message on a RACH, received an UL grant, and transmitted uplink data in response to the received grant.

Therefore, aspects of the present disclosure also provide a design in which advanced receiver algorithms, at an eNB, separate transmissions from UEs even when uplink collisions exist. As will be described in more detail herein, even when uplink transmissions from UEs may not be decoded (for example, due to uplink collisions), the eNB may identify a UE that transmitted the unsuccessfully decoded transmission, and may transmit an uplink grant to the identified UE. In this manner, the identified UE may transmit its uplink data, contention-free, on an uplink channel.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

FIG. 1 shows a wireless communication network 100 (e.g., an LTE network), in which the techniques described herein may be practiced. For example, the techniques may be utilized for communications between groups of UEs 120 and an eNB 110. As will be described in more detail herein, the eNB 110 may assign groups of resources to groups of one or more UEs 120 for contention-based access within an uplink subframe. Further, the eNB 110 may decode, uplink transmissions received from the UEs 120 in the subframe based, at least in part, on the assigned group of resources.

As illustrated, the wireless network 100 may include a number of evolved Node Bs (eNBs) 110 and other network entities. An eNB may be a station that communicates with user equipment devices and may also be referred to as a BS, a Node B, an access point (AP), etc. Each eNB 110 may provide communication coverage for a particular geographic area. The term "cell" may refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a smart phone, a personal digital assistant (PDA), a wireless modem, a wireless communication device, a handheld device, a laptop computer, a smartbook, an ultrabook, a cordless phone, a wireless local loop (WLL) station, a tablet, a position location device, a gaming device, a camera, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

A UE may be within the coverage of multiple eNBs. One of these eNBs may be selected to serve the UE. The serving eNB may be selected, for example, based on various criteria such as received power, received quality, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120$y$ may be close to femto eNB 110$y$ and may have high received power for eNB 110$y$. However, UE 120$y$ may not be able to access femto eNB 110$y$ due to restricted association and may then connect to macro eNB 110$c$ with lower received power (as shown in FIG. 1) or to femto eNB 110$z$ also with lower received power (not shown in FIG. 1). UE 120$y$ may then observe high interference from femto eNB 110$y$ on the downlink and may also cause high interference to eNB 110$y$ on the uplink.

A dominant interference scenario may also occur due to range extension, which is a scenario in which a UE connects to an eNB with lower path loss and lower SNR among all eNBs detected by the UE. For example, in FIG. 1, UE 120$x$ may detect macro eNB 110$b$ and pico eNB 110$x$ and may have lower received power for eNB 110$x$ than eNB 110$b$. Nevertheless, it may be desirable for UE 120$x$ to connect to pico eNB 110$x$ if the path loss for eNB 110$x$ is lower than the path loss for macro eNB 110$b$. This may result in less interference to the wireless network for a given data rate for UE 120$x$.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (e.g., and not based on the transmit power level of the eNB).

According to aspects, and as will be described in more detail herein, an eNB 110 may assign different groups of resources to groups of UEs 120. Each of the UEs 120 may select resources from its assigned group of resources for contention-based access within an uplink subframe. According to the techniques described herein, the eNB 110 may decode uplink transmissions based, at least in part, on the assigned group of resources. Furthermore, when an uplink transmission is not successfully decoded by the eNB 110, the eNB may identify the UE that transmitted the uplink transmissions, for example, based on a detected demodulated reference signal (DMRS). Regardless of the receiver algorithms used by the eNB to identify the UE, upon identification, the eNB may transmit an uplink grant to the identified UE.

Figure 2:
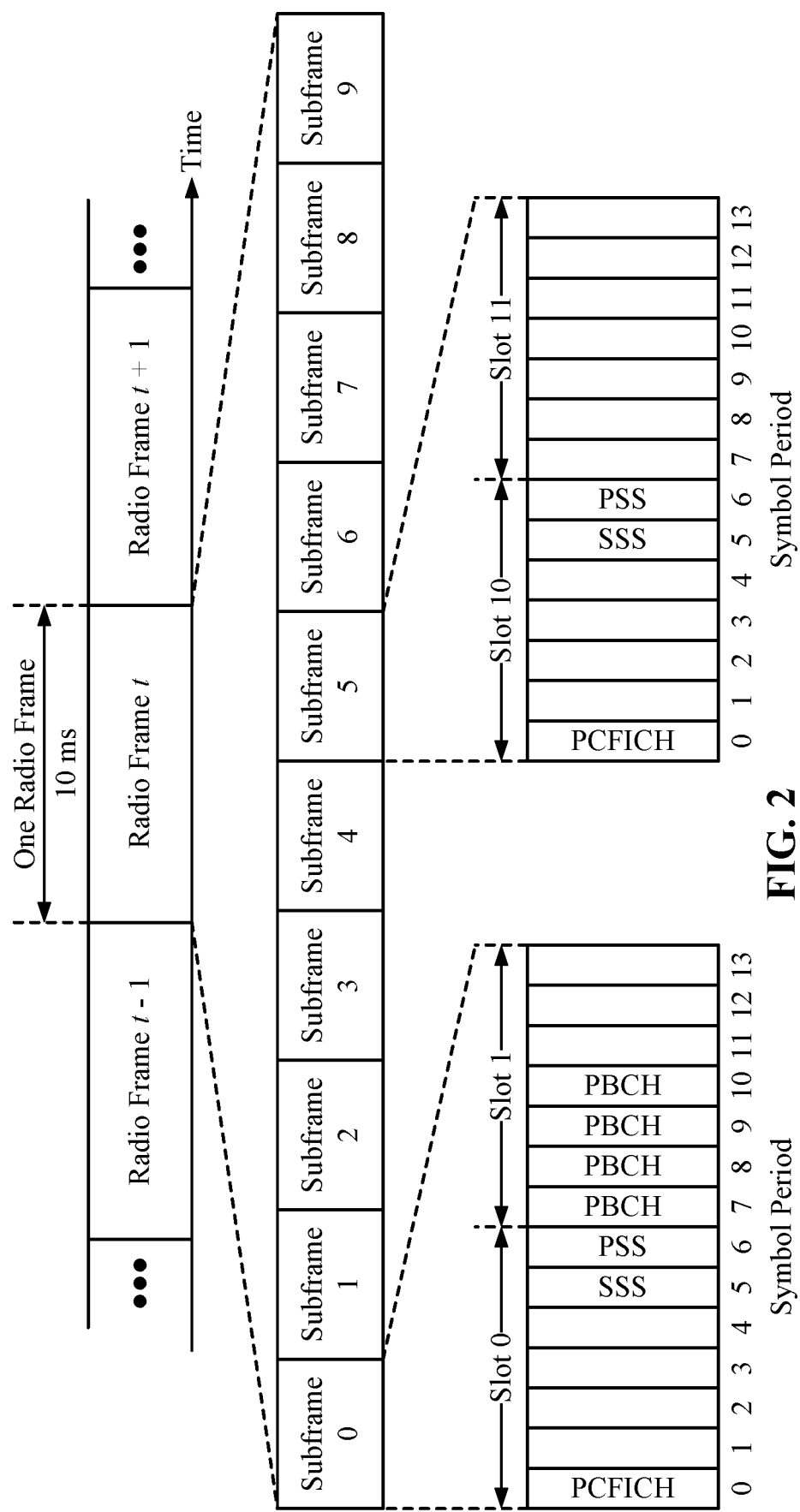
FIG. 2 is a block diagram conceptually illustrating an example of a frame structure in a wireless communications network in accordance with certain aspects of the present disclosure.

FIG. 2 shows a frame structure used in LTE. For example, eNB 110 may communicate on the DL using the illustrated frame structure.

The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
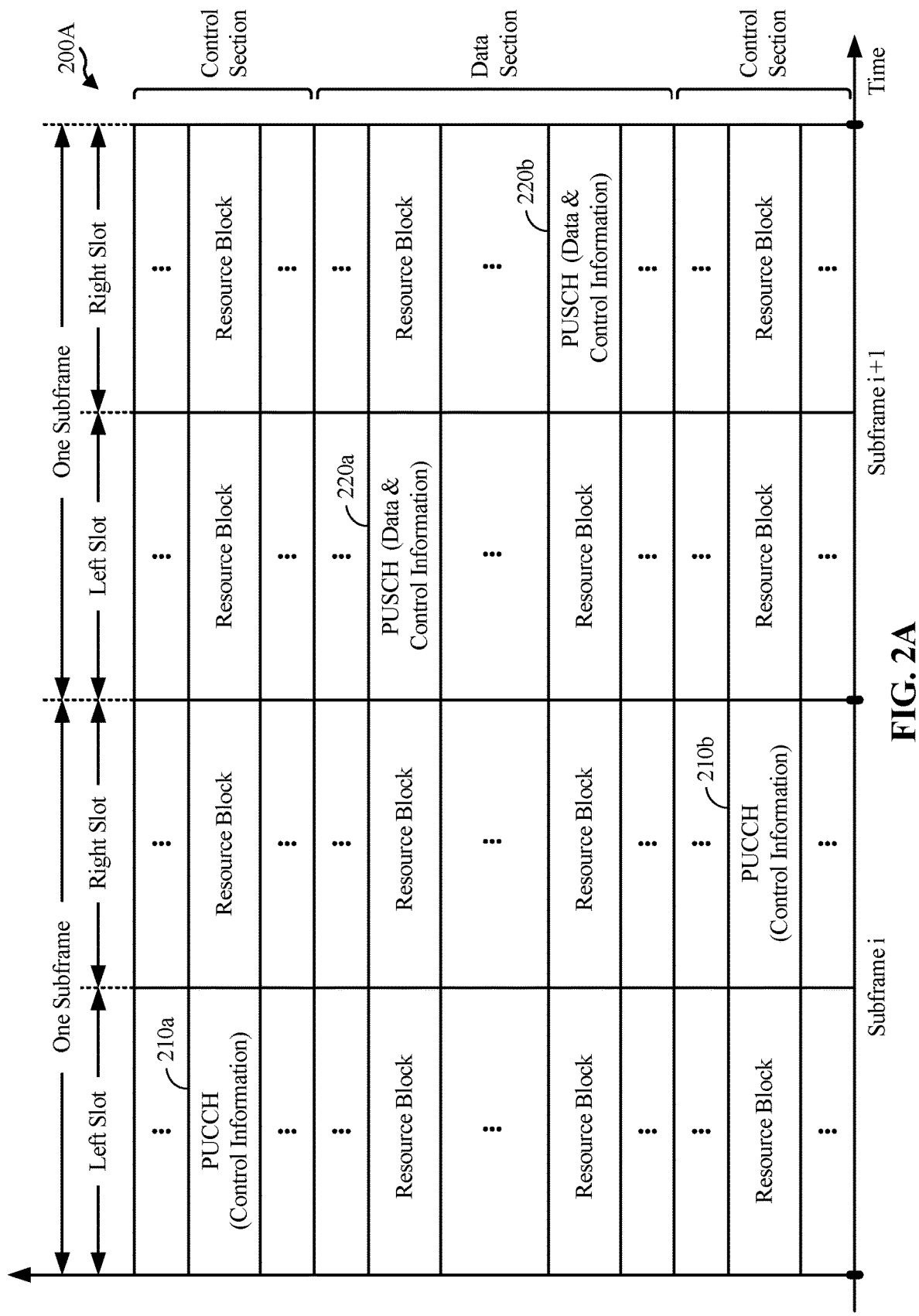
FIG. 2A shows an example format for the uplink in Long Term Evolution (LTE) in accordance with certain aspects of the present disclosure.

FIG. 2A shows an exemplary format 200A for the uplink in LTE. As described herein, an eNB may assign groups of uplink resources to groups of one or more UEs for contention-based access within an uplink subframe. The eNB may decode uplink transmissions received from the UEs in the subframe based, at least in part, on the assigned group of resources.

The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

Figure 3:
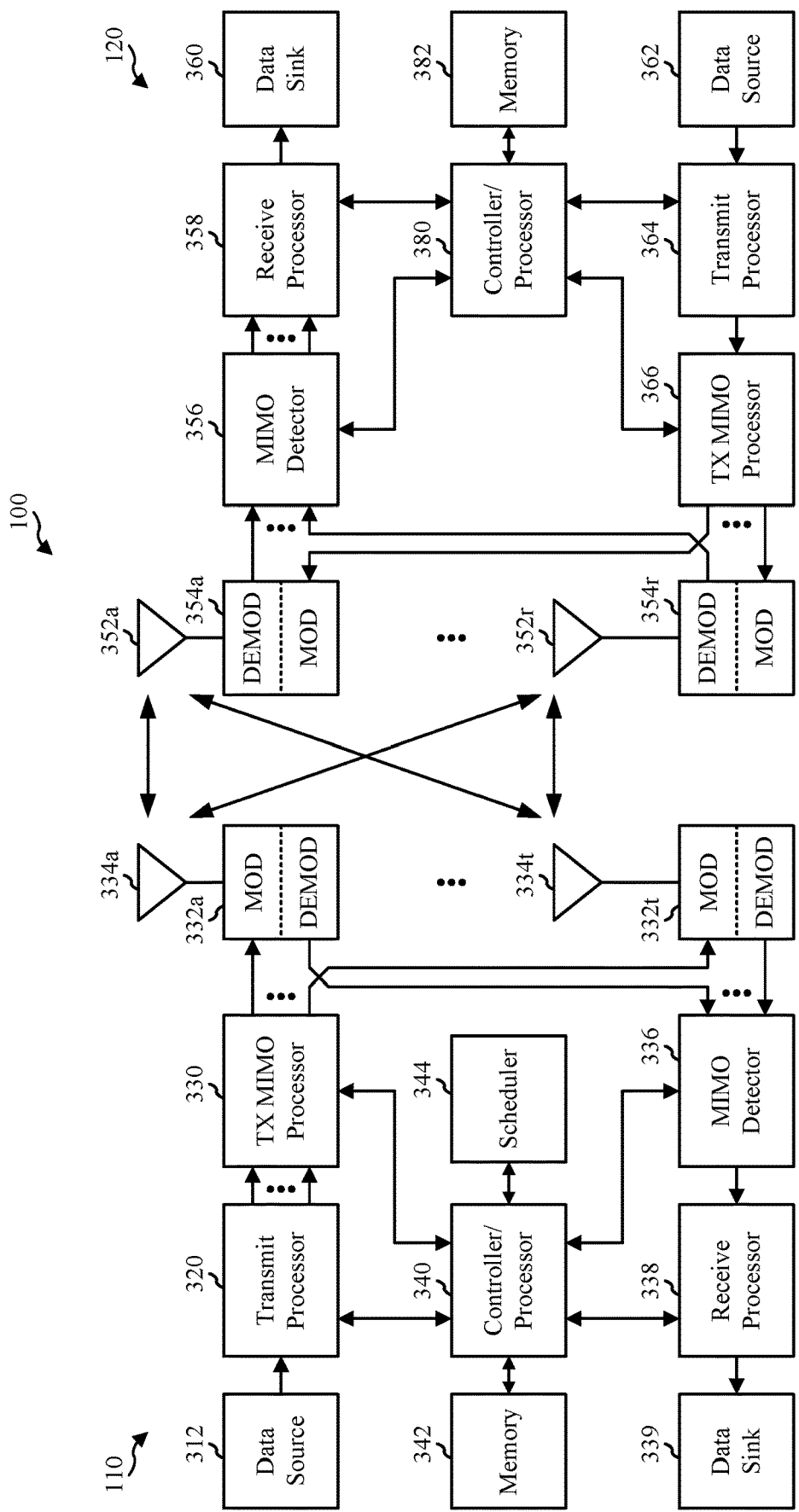
FIG. 3 shows a block diagram conceptually illustrating an example of an eNB in communication with a UE in a wireless communications network in accordance with certain aspects of the present disclosure.

FIG. 3 illustrates a block diagram of a design of a BS/eNB 110 and a UE 120 in the wireless communication network 100. In certain aspects, the BS/eNB 110 may be one of the BSs/eNBs illustrated in FIG. 1 and the UE 120 may be one of the UEs illustrated in FIG. 1. The BSs/eNBs and UEs described herein may include one or more modules as shown in FIG. 3. The BS/eNB 110 may be configured to perform the operations described herein, and as detailed in FIG. 6.

For a restricted association scenario, the eNB 110 may be macro eNB 110c in FIG. 1, and UE 120 may be UE 120y in FIG. 1. The eNB 110 may also be a BS of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controller/processor 340, 380 may direct the operation at the eNB 110 and the UE 120, respectively. For example, the controller/processor 340 and/or other processors and modules at the BS/eNB 110 may perform or direct operations described below with reference to FIG. 6 and/or other processes for the techniques described herein. The memory 342 may store data and program codes for the eNB 110. A scheduler 344 may schedule and/or assign groups of resources, within an uplink subframe to different groups of one or more UEs. One or more antennas 334 and demodulators/modulators 332 may decode received UL transmissions from the UEs, based at least in part on the assigned group of resources, receive a buffer status report (BSR) in an uplink transmission from at least one of the UEs, and/or transmit an UL grant.

LOW LATENCY PHY DESIGN ASPECTS FOR CONTENTION-BASED UPLINK ACCESS

According to certain aspects, a UE or eNB may support a low latency ("LL" or ultra low latency "ULL") capability. As used herein, the term ultra low latency capability generally refers to the capability to perform certain procedures with low latency relative to devices that lack the capability (e.g., so called "legacy" devices). In one implementation, the ULL capability may refer to the ability to support transmission time interval (TTI) periods around 0.1 ms or less (e.g., 20 µs) (with 0.1 ms or 20 µs corresponding to a conventional LTE subframe duration). However, it should be noted that, in other implementations, the ULL capability may refer to other low latency periods. Some examples of TTI considered for LL or ULL include: TTI spanning one slot (½ of a subframe), TTI spanning one symbol ($1/14^{th}$ of a subframe), or TTI spanning $1/10^{th}$ of a subframe.

As described above, in current LTE networks, a UE transmits a SR or a message on a RACH prior to transmitting uplink data to an eNB. In response, the eNB transmits an uplink grant to the UE and the UE transmits uplink data according to its received grant. Accordingly, the delay in the uplink transmission may include, for example, the SR delay (e.g., depending on periodicity), the time to receive an uplink grant, and the time to transmit the uplink data. Aspects of the present disclosure decrease this delay.

For contention-based uplink access (e.g., on the PUSCH), the eNB may provide persistent uplink (PUSCH) assignments to multiple UEs. For example, multiple UEs may be assigned overlapping resources. The UEs may directly transmit on the uplink channel according to their pre-assigned resources.

Several considerations regarding contention-based uplink channel access exist. For example, an eNB may control how uplink resources are assigned to UEs. The eNB may pre-assign exact resources to each of the UEs. The eNB may overload different users sharing the same time-frequency resources. For contention-based uplink access, the UE may transmit when it has data. When the UE does not have uplink data to transmit, the UE may enter a power saving mode (e.g., discontinuous transmission (DTx), sleep mode, idle mode, etc.).

According to another example, for contention-based uplink access, the eNB may assign UEs a region of resources, as opposed to exact resources. In response, each UE may randomly select the resources within the assigned region to use for uplink transmission.

To decode uplink transmissions, the eNB may need to separate transmissions received from different UEs. Data transmitted on the PUSCH may have a different cell radio network temporary identity (C-RNTI) based scrambling. Additionally or alternatively, a user may use different sequence and/or shifts for its demodulated reference signals (DMRS). The sequences or shifts may be assigned to the UE or may be randomly selected by the UE. Additionally or alternatively, transmissions from different UEs may be separated using spatial separation (e.g., multiple antenna processing).

As described herein, advanced receiver processing, at the eNB, with interference cancellation may be used to separate contention-based transmissions received from different UEs. Further, code division multiplexing (CDM) or Walsh covers may be applied to the DMRS and/or PUSCH transmissions across different transmission time intervals (TTIs). In this manner, UEs may be separated by orthogonal codes in contention-based transmission scenarios.

Figure 4:
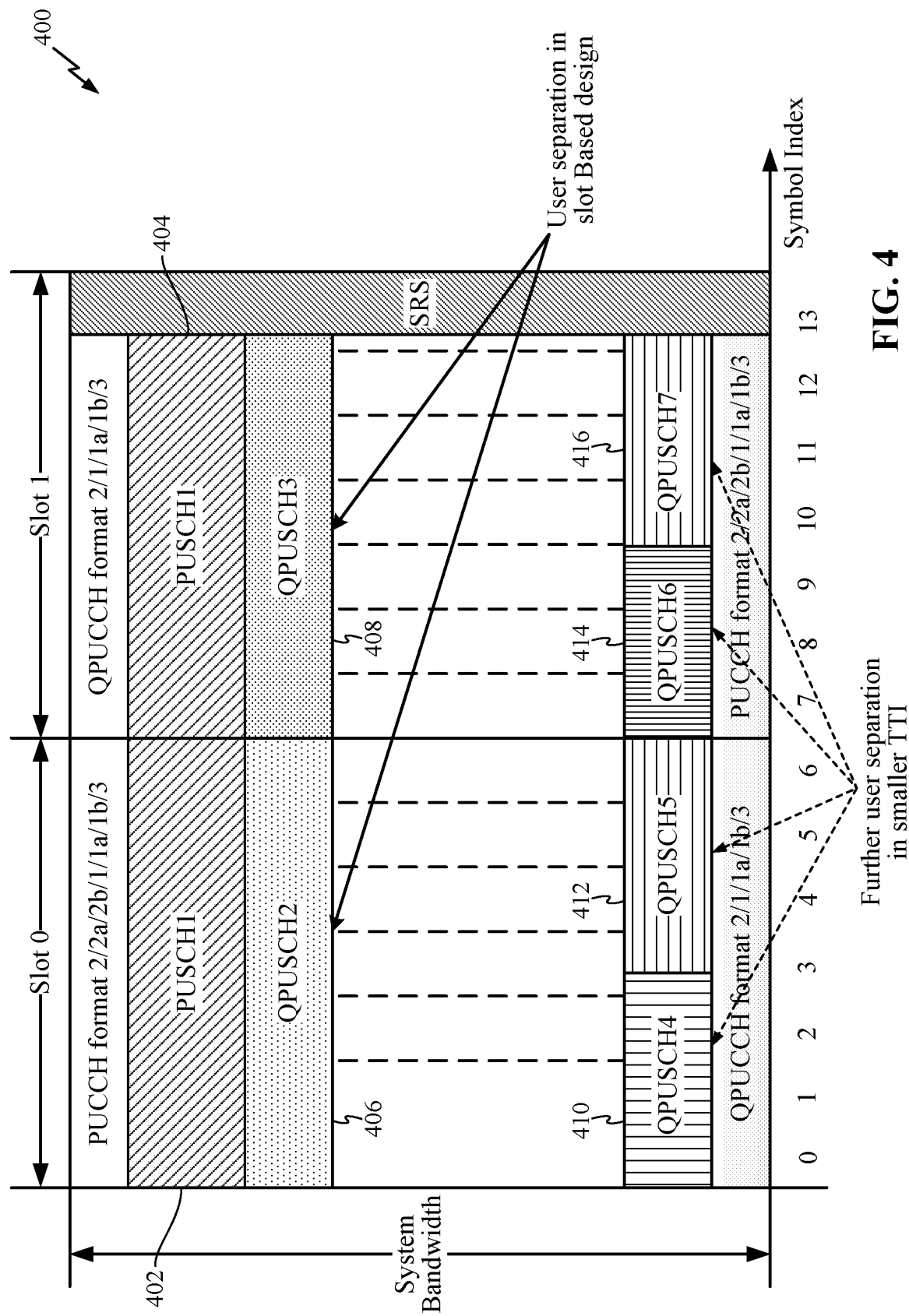
FIG. 4 illustrates examples of reduced transmission time intervals (TTI), according to aspects of the present disclosure.

FIG. 4 illustrates an example 400 subframe with collision avoidance with reduced TTI, according to aspects of the present disclosure. Two slots, Slot 0 and Slot 1, of a subframe 400 are illustrated. Conventionally, a single user may be assigned to both uplink slots, as shown at 402 and 404.

According to aspects of the present disclosure, an eNB may assign, to a group of UEs, resources corresponding to a TTI with a duration that is less than a subframe. For example, a group of UEs may be assigned to at least one group of resources 406, which is less than a subframe. Another group of UEs may be assigned to at least one group of resources 408, which is also less than a subframe.

According to aspects, the TTI may have a duration that is less than one time slot of the subframe. For example, a group of UEs may be assigned to at least one group of resources 410, which is less than one slot of the subframe. Other TTIs 412, 414, and 416, which also have a duration that is less than one slot of a subframe, may be assigned to different groups of one or more UEs.

According to aspects, a reduced TTI (e.g., TTI less than one subframe) duration may be used for UEs with packets to transmit that are small enough to fit into the smaller TTI. For example, metered, machine-type communication (MTC) UEs may be assigned a reduced TTI duration. MTC UEs may communicate with a BS/eNB, another remote device, or some other entity. Machine type communications may involve one or more entities that do not necessarily need human interaction. Examples of MTC devices include various wireless sensors, monitors, detectors, meters, or other type data monitoring, generating, or relaying devices that may be expected to operate (possibly unattended) for years on a single battery charge. MTC UEs may operate in a Cellular Internet of Things (CIOT), whereby UEs may collect and transmit data.

According to aspects, a reduced TTI duration may be assigned to UEs to transmit a buffer status report (BSR) along with small packet data (e.g., MTC data). The eNB may provide one or more grants for subsequent uplink transmission based, at least in part, on the BSR.

According to aspects, in an effort to avoid uplink collisions in contention-based uplink access, an eNB with a multi-user detection (MUD) receiver may assign UEs with different cyclic shifts and/or different root sequences for DMRS and overlapping assigned resources on the uplink channel (e.g., PUSCH).

When the UE has UL data to transmit, the UE may transmit on the uplink channel according to its persistent assignment, using the assigned shift and/or root sequence. The UE may refrain from transmitting when it does not have UL data.

The eNB may separate users using the received DMRS and may attempt to decode the uplink channel (e.g., PUSCH) with interference cancellation at the eNB receiver. For example, the eNB may use the assigned cyclic shifts and/or different assigned root sequences to identify different UEs and separate contention-based uplink transmissions. In this manner, according to aspects, the reduced shifts provide an additional dimension to increase the ability of an eNB to decode contention-based uplink transmissions.

Figure 5:
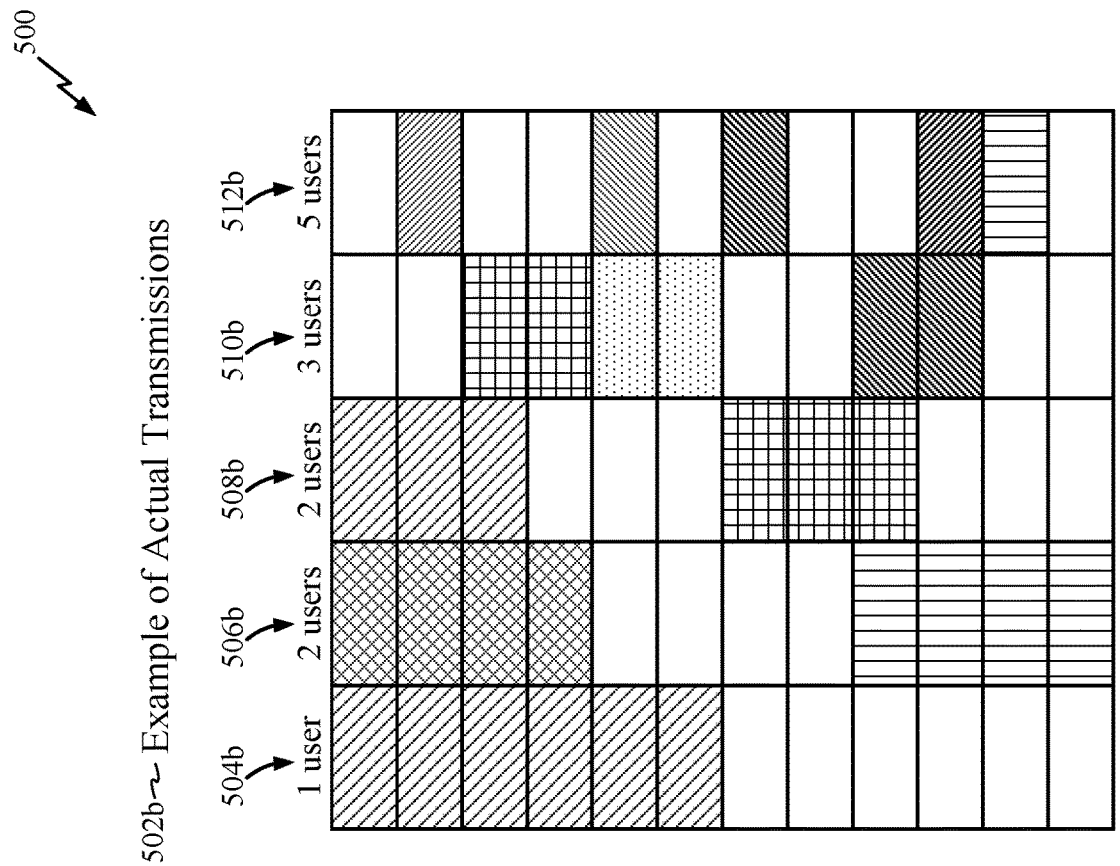
FIG. 5 illustrates examples of assigning different cyclic shifts to UEs within a group of UEs, according to aspects of the present disclosure.
Figure 5:
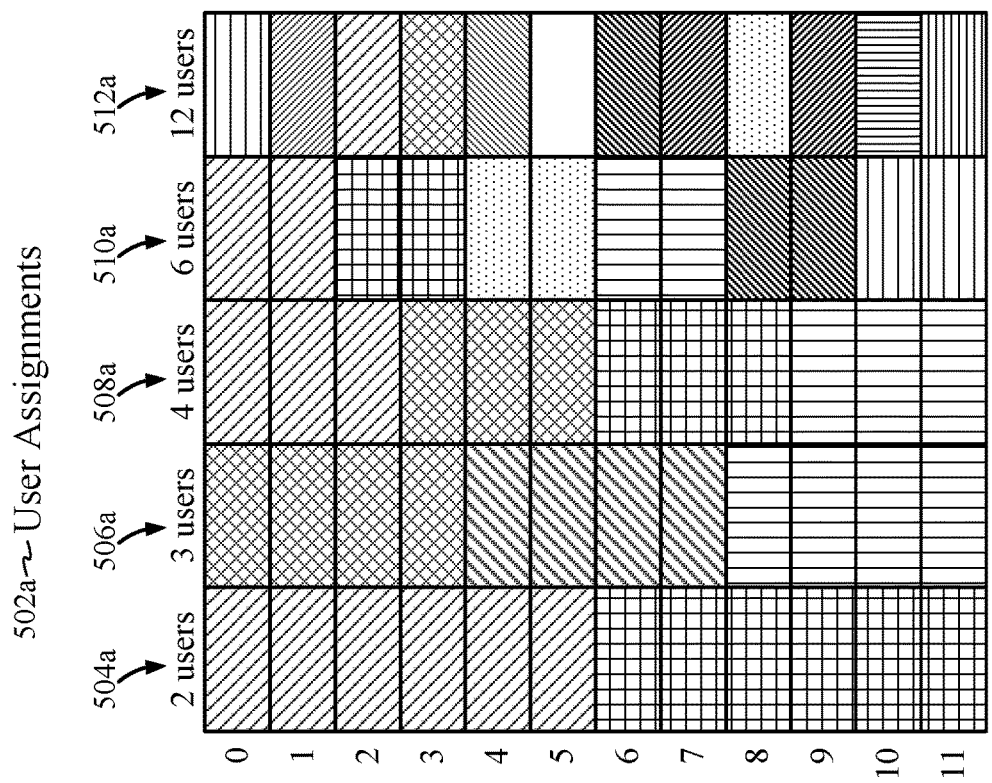

FIG. 5 illustrates an example of collision avoidance 500, according to aspects of the present disclosure. 502a illustrates example user assignments for UEs within a group of UE. 502b illustrates examples of actual uplink transmissions by users with assignments as shown in 502a.

As described above, different groups of UE may be assigned different groups of resources. Each UE within the group of UEs may be assigned cyclic shifts and/or root sequences as illustrated in 502a. For example, as shown at 504a, two users of the group may each be assigned different cyclic shifts and/or different root sequences, illustrated by the two shaded regions. As shown at 506a, three users of another group of UEs may each be assigned different cyclic shifts and/or different root sequences, as shown by the three shaded regions. Similarly, groups of four, six, and twelve users may each be assigned different cyclic shifts and/or different root sequences as shown at 508a, 510a, and 512a, respectively.

Example uplink transmissions by UEs of a group of UEs are illustrated at 502b. At 504b, only one user of the group of two users (e.g., at 504a) transmitted using its assigned cyclic shift and/or root sequence, as is shown by the single shaded region. At 506b, while three users of a group were each assigned different cyclic shifts and/or different root sequences (e.g., at 506a), only two users, shown by the two shaded regions, transmitted using their assigned cyclic shifts and/or different root sequences. Similarly, while four, six, and twelve users were each assigned different cyclic shifts and/or different root sequences as shown at 508a, 510a, and 512a, only two, three, and five users, respectively, actually transmitted as shown by the corresponding two shaded regions of 508b, three shaded regions of 510b, and five shaded regions of 512b in 502b. As described above, the eNB receiving contention-based uplink transmissions may attempt to separate users using the shift and/or sequence of the received uplink transmission.

As described above, collision handling at an eNB is important in contention-based uplink channel access, so as not to increase latency as compared to conventional means. In other words, it is desirable to have collision handling such that when an eNB does not successfully decode a detected DMRS from at least one uplink transmission, latency is not worse than if the UE had transmitted a SR, received an uplink grant in response to the SR, and transmitted data according to the received grant.

According to aspects of the present disclosure, the eNB may rely on DMRS design and receiver processing to identify the transmitting UE when decoding is unsuccessful. For example, the eNB may configure unique sequences (root and/or cyclic shift sequences) for each UE. When the eNB decodes the uplink channel and detects the presence of a UE's transmission, it may acknowledge the transmission and/or assign further resources depending on a received BSR.

When the eNB is unable to decode the uplink channel, for example based on detecting the UE's DMRS, the eNB may identify the UE that sent the uplink transmission which was not successfully received, and transmit an uplink assignment to the identified UE. Thus, when collisions occur on the contention-based uplink channel within a subframe, the eNB may use collision handling techniques to identify a user that transmitted the unsuccessfully decoded uplink transmission. The eNB may subsequently transmit an uplink grant to the identified user. In this manner, aspects of the present disclosure provide techniques for contention-based uplink channel access wherein the latency may not be worse than conventional means.

Furthermore, DMRS designs may be improved for better UE identification. For example, more DMRS symbols may be used and/or additional root sequences may be employed. Additionally or alternatively, the eNB may assign users different resources if collisions occur frequently.

As described above, the user may be identified in contention-based uplink access based, at least in part, on the detected DMRS and assigned root and/or shift sequence. The eNB may perform interference cancellation based on the partial decoding of an uplink transmission received from at least one UE to decode an uplink transmissions received from another UE. With interference cancellation, the eNB may have knowledge of what UEs are assigned on what resources, which may improve demodulation performance and may support more users for contention-based uplink channel access. According to aspects, interference cancellation may work with users with different coding rates/different rate distribution (e.g., according to rate region), HARQ termination targets, number of retransmissions in a HARQ process, and/or traffic needs. Thus, an eNB may assign different groups of resources to different groups of UEs taking at least one of these factors into account.

Figure 6:
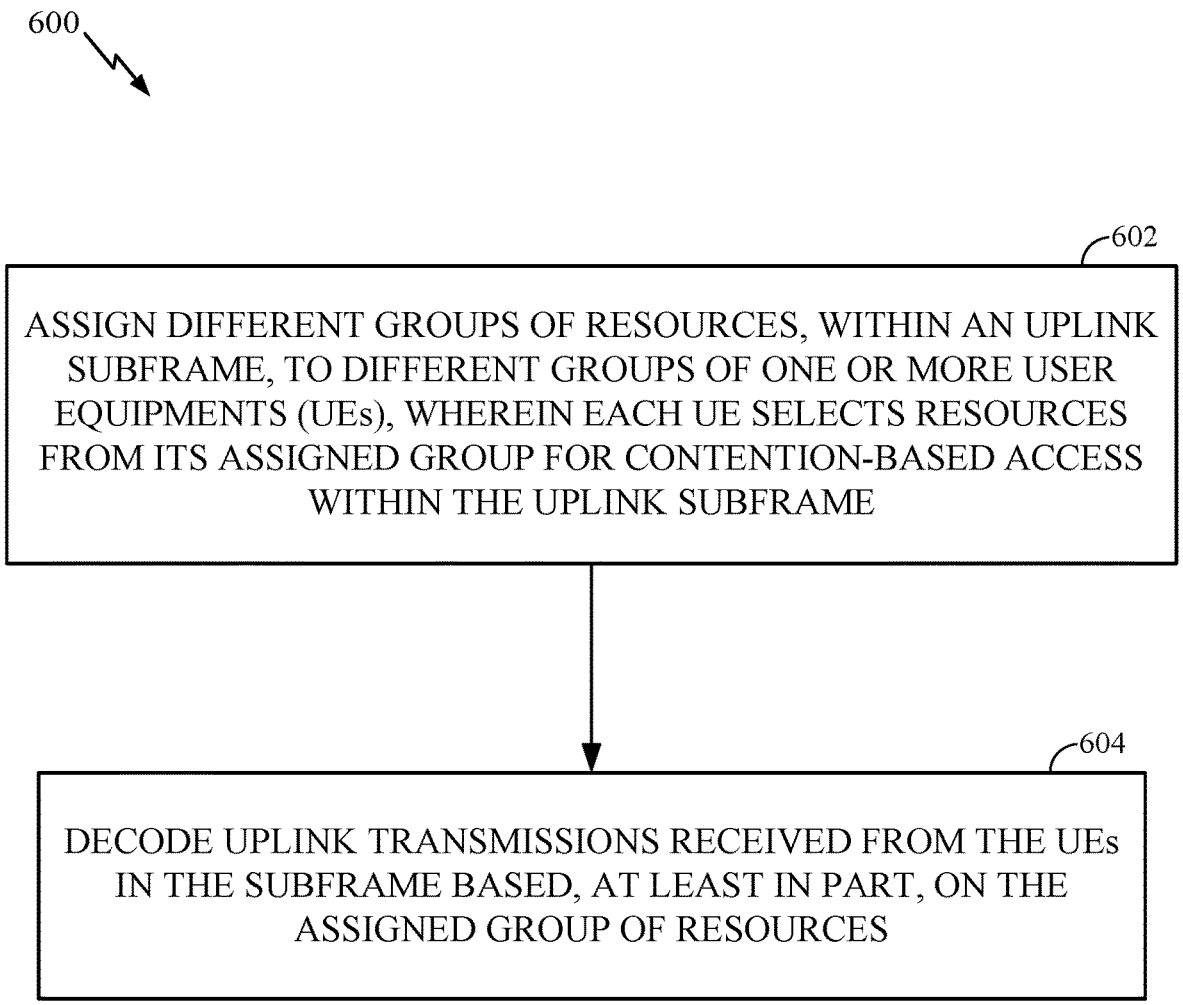
FIG. 6 illustrates example operations performed, for example, by an eNB, according to aspects of the present disclosure.

FIG. 6 illustrates example operations 600 performed by an eNB, such as eNB 110 of FIG. 1 with one or more components of the eNB 110 illustrated in FIG. 3, according to aspects of the present disclosure. For example, modulator/demodulator, 332, antenna 334, schedule 344, one or more controller/processors 340, and memory 342 may perform the operations of FIG. 6 and the methods described herein.

At 602, the eNB may assign different groups of resources, within an uplink subframe, to different groups of one or more UEs. Each UE may select resources from its assigned group for contention-based access within the uplink subframe.

At 604, the eNB may decode uplink transmissions received from the UEs in the subframe based, at least in part, on the assigned group of resources.

As described with reference to FIG. 4, the eNB may assign, to a group of one or more UEs, at least one group of resources corresponding to a TTI with a duration that is less than a subframe 400. According to aspects, the TTI may have a duration that is less than one time slot of a subframe.

As described with reference to FIG. 5, the eNB may assign different cyclic shifts or root sequences to each UE within a group of UEs. The eNB may decode uplink transmissions by distinguishing different UEs using the different cyclic shifts or root sequences. Further, the eNB may perform interference cancellation, based, at least in part, on an uplink transmission from at least one of the distinguished UEs, to decode an uplink transmission from another UE.

As described herein, the eNB generally decodes the uplink transmissions received from the UEs in the subframe by performing interference cancellation. The interference cancellation is based, at least, on a partial decoding of an uplink transmission received from at least one UE, to decode an uplink transmission from another UE. Furthermore, an eNB may generally assign different groups of resources to different groups of UEs based on least one of coding rates or traffic needs of the different UEs.

As described above, aspects of the present disclosure provide for latency reduction for UEs in a RRC connected mode. During contention-based uplink access by groups of UEs within a subframe, an eNB may decode the received uplink transmission based, at least in part, on the resources used for transmission. Furthermore, when the eNB fails to successfully decode the uplink transmission, the eNB may identify the UE that sent the uplink transmission based on, for example, a detected reference signal, and may transmit an uplink assignment to the identified UE. Using such collision handling, latency may be no worse than conventional means.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communication by a user equipment (UE), comprising:
 receiving an assignment assigning a group of resources within an uplink subframe to a group of UEs including the UE;
 selecting, by the UE, resources from its assigned group of resources for contention-based access within the uplink subframe;
 transmitting, to a base station (BS), an uplink transmission in the uplink subframe based, at least in part, on the selected resources, wherein the uplink transmission comprises a demodulation reference signal (DMRS);
 receiving an uplink assignment in response to at least the DMRS of the uplink transmission; and
 transmitting subsequent uplink transmissions using the uplink assignment.

2. The method of claim 1, wherein the assignment comprises a group of resources corresponding to a transmission time interval (TTI) with a duration that is less than a subframe.

3. The method of claim 2, wherein the TTI has a duration of less than one time slot of the subframe.

4. The method of claim 2, wherein the uplink transmission further comprises a buffer status report (BSR).

5. The method of claim 1, wherein the group of resources comprises different orthogonal codes assigned to each UE within the group of UEs.

6. The method of claim 1, wherein the group of resources comprises different cyclic shifts or root sequences assigned to each UE within the group of UEs.

7. The method of claim 1, wherein the UE comprises a machine-type communication (MTC) UE.

8. The method of claim 1, wherein the group of resources is based on at least one of a coding rate, a hybrid automatic repeat request (HARQ) termination target, a number of retransmissions in a HARQ process, or a traffic need associated with the UE.

9. An apparatus for wireless communication by a user equipment (UE), comprising at least one processor and a memory coupled to the at least one processor, wherein the at least one processor is configured to:
 receive an assignment assigning a group of resources within an uplink subframe to a group of UEs including the UE;
 select, by the UE, resources from its assigned group of resources for contention-based access within the uplink subframe;
 transmit, to a base station (BS), an uplink transmission in the uplink subframe based, at least in part, on the selected resources, wherein the uplink transmission comprises a demodulation reference signal (DMRS);
 receive an uplink assignment in response to at least the DMRS of the uplink transmission; and
 transmit subsequent uplink transmissions using the uplink assignment.

10. The apparatus of claim 9, wherein the assignment comprises a group of resources corresponding to a transmission time interval (TTI) with a duration that is less than a subframe.

11. The apparatus of claim 10, wherein the TTI has a duration of less than one time slot of the subframe.

12. The apparatus of claim 10, wherein the uplink transmission further comprises a buffer status report (BSR).

13. The apparatus of claim 9, wherein the group of resources comprises different orthogonal codes assigned to each UE within the group of UEs.

14. The apparatus of claim 9, wherein the group of resources comprises different cyclic shifts or root sequences assigned to each UE within the group of UEs.

15. The apparatus of claim 9, wherein the UE comprises a machine-type communication (MTC) UE.

16. An apparatus for wireless communication by a user equipment (UE), comprising:
 means for receiving an assignment assigning a group of resources within an uplink subframe to a group of UEs including the UE;
 means for selecting, by the UE, resources from its assigned group of resources for contention-based access within the uplink subframe;
 means for transmitting, to a base station (BS), an uplink transmission in the uplink subframe based, at least in part, on the selected resources, wherein the uplink transmission comprises a demodulation reference signal (DMRS);
 means for receive an uplink assignment in response to at least the DMRS of the uplink transmission; and
 means for transmitting subsequent uplink transmissions using the uplink assignment.

17. The apparatus of claim 16, wherein the assignment comprises a group of resources corresponding to a transmission time interval (TTI) with a duration that is less than a subframe.

18. The apparatus of claim 17, wherein the TTI has a duration of less than one time slot of the subframe.

19. The apparatus of claim 17, wherein the uplink transmission further comprises a buffer status report (BSR).

20. The apparatus of claim 16, wherein the group of resources comprises different orthogonal codes assigned to each UE within the group of UEs.

21. The apparatus of claim 16, wherein the group of resources comprises different cyclic shifts or root sequences assigned to each UE within the group of UEs.

* * * * *